United States Patent
Ruddy

[15] 3,668,929
[45] June 13, 1972

[54] METER TANGENTS

[72] Inventor: Donald C. Ruddy, Willow Grove, Pa.

[73] Assignee: The Singer Company, New York, N.Y.

[22] Filed: Sept. 8, 1970

[21] Appl. No.: 70,280

[52] U.S. Cl. .................................................. 73/281
[51] Int. Cl. .................................................. G01f 3/22
[58] Field of Search .................. 73/281, 262, 263, 264, 268

[56] References Cited

UNITED STATES PATENTS

| | | | |
|---|---|---|---|
| 1,827,973 | 10/1931 | Dezendorf | 73/281 |
| 3,455,173 | 7/1969 | Meyer | 73/281 X |
| 1,893,022 | 1/1933 | Dowillard | 73/281 |

FOREIGN PATENTS OR APPLICATIONS

| | | | |
|---|---|---|---|
| 10,075 | 3/1896 | Great Britain | 73/281 |

Primary Examiner—James J. Gill
Attorney—Marshall J. Breen, Chester A. Williams, Jr. and Harold Weinstein

[57] ABSTRACT

A tangent for a meter having a plurality of tangent members locked in adjusted position by a releasable locking means so that during normal operation the adjustment components thereof are not subject to strain, wear, or the action of the operational working forces. Upon release of the locking means the tangent can be adjusted for stroke and timing in the respective longitudinal and transverse directions by rotation of separate adjusting screws. Each of the adjusting screws is held captive in one of the adjacent tangent members and engages a threaded portion in the other of the adjacent tangent members, whereby rotation of said screw causes relative motion between the tangent members to move the same toward or away from each other.

4 Claims, 9 Drawing Figures

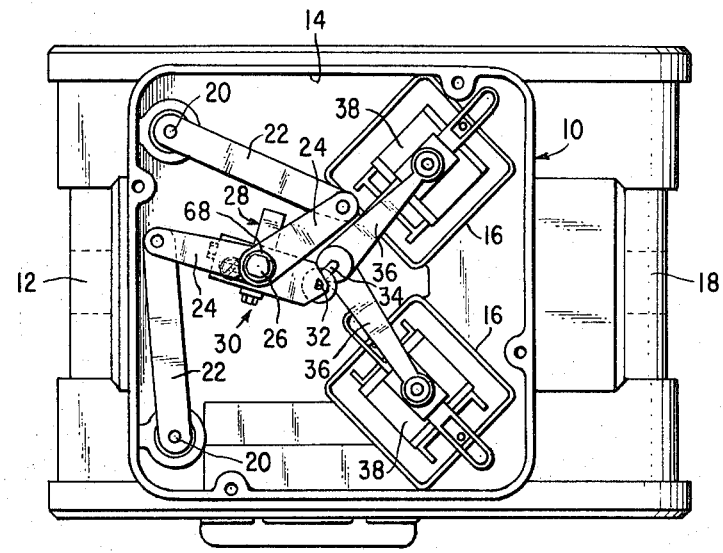
Fig. 1
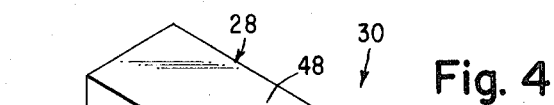
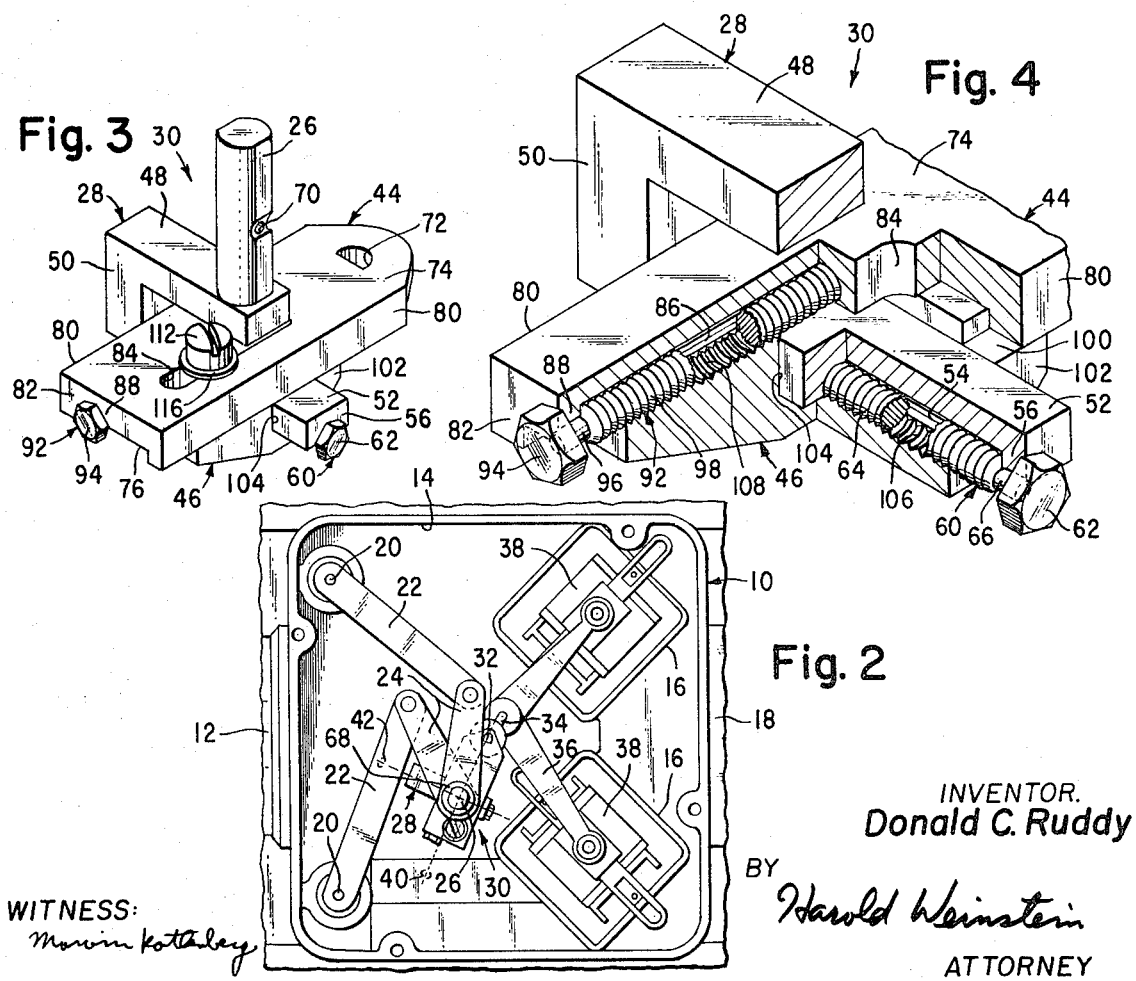
Fig. 3
Fig. 4
Fig. 2
INVENTOR.
Donald C. Ruddy
BY Harold Weinstein
ATTORNEY

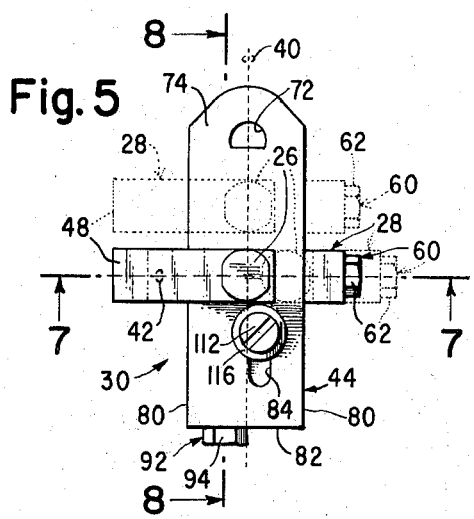
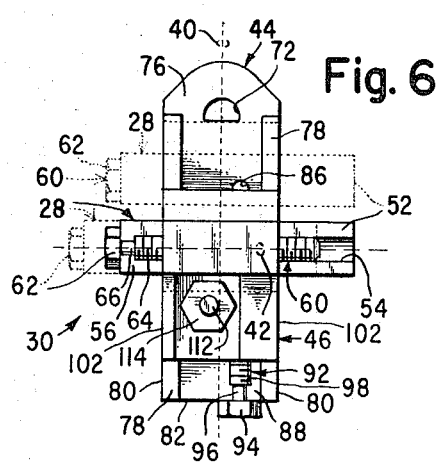
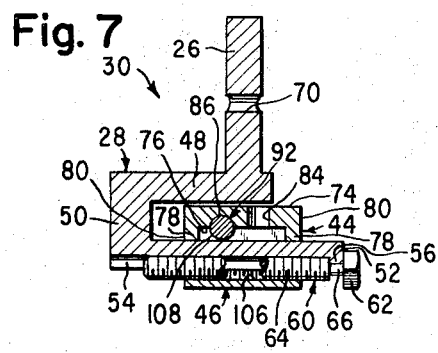
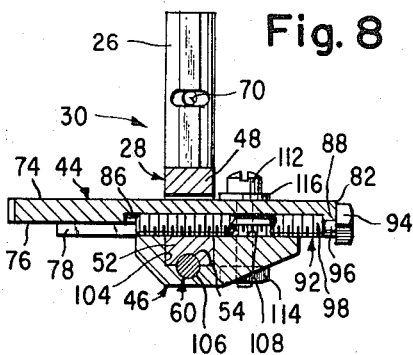
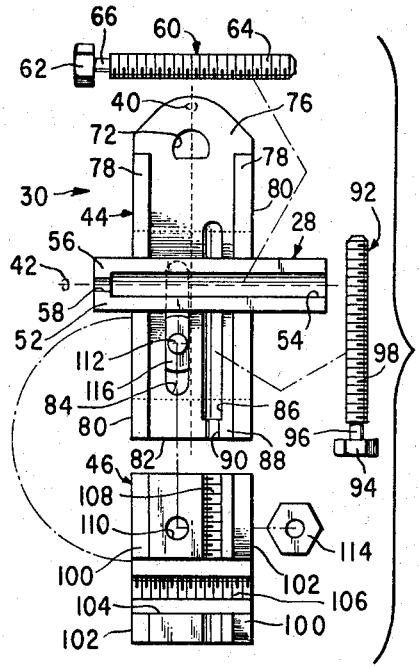
INVENTOR.
Donald C. Ruddy dialent to the longitudinal line 40 relating to the stroke of the valves.
METER TANGENTS

BACKGROUND OF THE INVENTION

Prior art meter tangents used annular threaded members which were subject to the operational working forces of the meter. The construction of the prior art devices required that the adjustment means also serve as the locking means. The prior art construction caused wear and strain on the adjustment components adversely affecting the adjustment of the meter tangent resulting in more faulty settings and require more frequent adjustments.

SUMMARY OF THE INVENTION

It is an object of the present invention to provide an improved meter tangent which overcomes the prior art disadvantages; which is simple, economical and reliable; which uses separate adjustment means for meter stroke and meter timing and locking means; which uses releasable locking means that release to permit adjustment thereof; which uses interconnected tangent members; which uses adjustment screws held captive in one of the adjacent tangent members and threadedly engaging the other of the adjacent tangent members whereby on rotation of the screw the adjacent tangent members will move relative each other; which uses separate and individual longitudinal and transverse adjustment means; and which provides a positive lock so as to clamp the tangent members together and create a high mechanical friction therebetween that resists any slippage without causing any strain or wear on the adjustment means during normal operation of the gas meter.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a top plan view, with the cover removed, of a meter embodying the improved tangent of the present invention;

FIG. 2 is a top plan view of the meter of FIG. 1 with the improved tangent in a position in which it would be adjusted, and the adjustment screws thereof accessible;

FIG. 3 is a perspective view of the improved tangent of the present invention;

FIG. 4 is an enlarged perspective, partly in section, of the improved tangent showing the tangent members and adjusting screws;

FIG. 5 is a top plan view of the improved tangent of the present invention;

FIG. 6 is a bottom plan view of the improved tangent of the present invention;

FIG. 7 is a view taken along line 7—7 of FIG. 5;

FIG. 8 is a view taken along line 8—8 of FIG. 5;

FIG. 9 is a bottom view of the improved tangent, partially exploded, to expose the operative parts thereof.

DESCRIPTION OF THE INVENTION

In the embodiment of the invention illustrated in FIGS. 1 and 2, the novel meter tangent is shown in a conventional gas meter, designated generally as 10. Gas enters the meter 10 from inlet 12 to pass into a gas distributing chamber 14 for delivery to the gas measuring chambers (not shown) through the valve seats 16 which control the flow of gas into and out of said gas measuring chambers for subsequent exiting from the meter at outlet 18. Flag rods 20 are connected to be actuated by said measuring chambers and are fixed to the crank arms 22 connected by links 24 to the wrist pin or post 26 formed integrally on the tangent wrist 28 of the improved meter tangent 30. The meter tangent 30 is fixed as at 32 to a crank shaft 34 having the usual crank connected by arms 36 to slide valves 38 on the valve seats 16. With the exception of the improved meter tangent, the components hereinbefore described are or may be of conventional design.

The volume of gas measured by the meter is controlled by the valves 38 which in turn are adjustable as to stroke and timing at the meter tangent 30. As shown in FIG. 2 the adjustment of the meter tangent 30 in the longitudinal direction represented by the dotted longitudinal line 40 will control the stroke of the valves 38 corresponding to the volume displacement thereof. Adjustment of the meter tangent 30 in a transverse direction represented by the dashed transverse line 42 will control the timing of the valve operation, so as to change the time of opening and closing of the valve 38. The transverse line 42 relating to the valve timing, is substantially perpendicular to the longitudinal line 40 relating to the stroke of the valves.

The improved meter tangent 30, as shown in FIGS. 3, 4 and 9, has a plurality of interconnected tangent members including the tangent wrist 28, a tangent arm or upper tangent arm 44, and a tangent base or lower tangent arm 46.

The tangent wrist 28 as illustrated in FIGS. 3, 7 and 8, has the wrist pin 26 extending upwardly from an upper leg 48 of a C-shaped portion 50, a lower leg 52 of which has a semicircular groove 54 extending the full length thereof. A downwardly turned flange 56 partially closes off one end of the groove 54 and has a shallower groove 58 formed therein. An adjustment screw 60 has a head 62, a threaded body portion 64 and an intermediate undercut portion 66 therebetween. The threaded body portion 64 of the screw 60 is disposed within the groove 54 and is held captive therein by the flange 56 extending into the undercut portion 66 to prevent linear travel of the screw 60 while permitting free rotation of the external head 62 thereof, for purposes more fully described hereinafter. A bushing 68, shown in FIGS. 1 and 2, is suitably affixed to the wrist pin 26 as by a pin (not shown) at aperture 70, and has the links 24 journaled thereon.

The upper tangent arm 44 has a D-shaped aperture 72 through which a nonrotatable connection with the crank shaft 34 is made, as at 32, as depicted in FIG. 1. The upper tangent arm 44 as illustrated in FIGS. 4, 7 and 9, has a flat upper surface 74 and a ridged undersurface 76. The undersurface 76 has parallel ridges 78 which extend along the longitudinal edges 80 from the end 82 remote from the aperture 72 substantially to the area adjacent said aperture. The longitudinal line 40 lies centrally of the tangent arm 44 and a longitudinal slot 84 is formed parallel to and on one side of the central line 40, while a longer longitudinal groove 86 is formed parallel to and on the other side of the central line 40. The longitudinal slot 84 as viewed in FIGS. 3 and 7, lies on the right side of the central line 40, while in FIG. 9, said slot lies on the left side thereof. Likewise the groove 86 as viewed in FIGS. 3 and 7, lies on the left side of the central line 40, while in FIG. 9, said groove lies on the right side thereof. The groove 86 is semicircular in shape and has a flange 88 formed adjacent the end 82 which flange extends into the groove 86 and forms a groove portion 90 of reduced diameter. An adjustment screw 92 having a head 94 at one end, and undercut portion 96 adjacent the head and intermediate the threaded body portion 98 thereof. The screw 92 is disposed with the head external of the tangent arm 44 and the threaded portion 98 lies within the longitudinal groove 86, with the flange 88 extending into the undercut portion 96 to hold the screw 92 from linear motion while permitting the same to rotate.

The lower tangent arm or tangent base 46 serves to interconnect the tangent arm 44 and the tangent wrist 28 for relative sliding movement therebetween along either the longitudinal line 40 or the transverse line 42 so as to permit the meter tangent 30 to be selectively adjustably positioned. The tangent base 46 as illustrated in FIGS. 4, 7, 8 and 9, has parallel recesses 100 extend the full longitudinal length of the upper surface thereof along opposite longitudinal edges 102. The depth of the recesses 100 corresponds to the height of the ridges 78 whereby the upper tangent arm 44 and the lower tangent arm 46 as seen best in FIGS. 4 and 7 engage each other to permit sliding longitudinal movement therebetween.

A deep recess 104 is formed in tangent base 46 to extend transversely from one edge 102 to the other edge 102, and thereby cut across shallower recesses 100. The recess 104 is sized to receive the lower leg 52 of the tangent wrist 28. A semicircular groove 106 is formed in the flat bottom of the deep recess 104 in alignment with the transverse groove 54 of the tangent wrist 28, and has threads formed therein corresponding to the threads of the threaded portion 64 of screw 60. A longitudinal groove 108 is formed on the tangent base 46 inwardly of the recess 100 and in line with the groove 86. The groove 108 is interrupted intermediate its length by the deep recess 104, and has the section thereof adjacent the flange 88 threaded to mate with the threaded body portion 98 of the screw 92. The portion of groove 108 remote from the aperture 72 is of sufficient diameter so as to receive the screw 92 and permit rotation thereof, but, of course, this section also could be threaded. Opposite the threaded groove 108 and inwardly of the recess 100, a circular aperture 110 is formed to extend through the tangent base 46 at a position corresponding to the slot 84. The aperture 110 is sized to receive a locking screw 112 which passes downwardly through the slot 84 to threadedly engage a nut 114 which, when tightened, will cause the lower tangent arm 46 to draw up against the upper tangent arm 44 clamping the captive tangent wrist 28 therebetween and locking the meter tangent 30 in its adjusted position. A flat washer 116 can be placed adjacent the head of the screw 112 in the usual manner.

When the screw 112 is loosened so as to unlock the tangent wrist 28, the upper tangent arm 44 and the lower tangent arm 46 of the meter tangent 30, relative motion therebetween is possible. If the timing is to be adjusted, relative motion along the transverse line 42 is obtained by rotation of the screw 60 so as to translate the same along the threads of the groove 106. The screw 60 is held captive in the lower leg 52 of the tangent wrist 28 so that the tangent wrist 28 partakes of the same translatory motion as the screw 60.

If the stroke is to be adjusted by relative motion along with longitudinal line 40 the screw 92 will be rotated. The screw 92 is held captive in the upper tangent arm 44 and on rotation of the screw 90, it will cause relative motion along the threaded groove 108 to shift the lower tangent arm 46 and the captive tangent wrist 28 along the longitudinal line 40. The upper tangent 44 is not moved itself, because it is directly connected to the crank shaft 34 as explained hereinafter.

Rotation of either screw 60 or 92 may be clockwise or counterclockwise. As shown in FIGS. 5 and 6, the meter timing may be adjusted along the transverse line 42 between the solid and dotted representations which represent "retard" and "advance" respectively of the tangent wrist 28 by rotation of the screw 60. Since the connection of the meter tangent at 32 represents a fixed point in that the crank shaft 34 has a fixed radius, the relative motion between the upper tangent arm 44 and the lower tangent arm 46 has to shift the lower tangent arm 46 and the interconnected tangent wrist 28 so as to change the radial distance between the wrist pin 26 and the point 32 of connection with the crank shaft 34. Accordingly, rotation of the screw 92 acts to longitudinally shift the lower tangent arm 46 and the interconnected tangent wrist 28 between the solid and dotted representations thereof which represent "slow" and "fast" respectively, along the longitudinal line 40. However, the meter tangent 30 is constructed so that the longitudinal line 40 and the transverse line 42 are substantially at 90° angles to each other, so as to avoid creating an angularity error. In other words, an adjustment for meter stroke can be made along the longitudinal line 40 without affecting the meter timing; and likewise an adjustment for meter timing can be made along the transverse line 42 without affecting the meter stroke.

No sliding motion will occur in the meter tangent 30 unless one or the other of the screws 60 or 92 is rotated. The lower tangent arm or tangent base 46 contains the female threads in the respective grooves 106 and 108, while the mating upper tangent arm 44 and tangent wrist 28 contain screw clearance and the holding flanges 88 and 56 respectively, which permit the screws to be rotated without corresponding linear travel. Thus, relative motion between the components of the meter tangent is achieved by rotation of the threaded screws 60 and 92 being held captive in the tangent wrist 28 or the upper tangent arm 44 respectively, while mating with the female threads in the respective grooves 106 and 108.

Once either the longitudinal or transverse screws 92 or 60 has been adjusted by rotation thereof, the mechanical interconnection of the mating parts holds the adjusted position. Thereafter, the locking screw 112 and nut 114 are tightened to lock the meter tangent 30 in operative position which acts to prohibit relative movement of the tangent wrist 28, tangent arm 44 and tangent base 46, and prevent the strain or wear otherwise imposed when said tangent members also perform the locking function. By the use of a separate locking screw 112 and nut 114, the said tangent members and the adjusted position thereof remain unaffected in spite of operational working forces, friction and stresses, acting upon the meter tangent 30.

Furthermore, separating the locking and adjusting functions removes the possibility of overtightening of the locking means causing damage to the adjusting means or adversely influencing the operative adjustment settings of the meter tangent 30.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what I claim herein is:

1. A tangent for a gas meter having a crank shaft driven by a flag assembly comprising:
   a. a plurality of tangent members,
   b. a tangent post formed on one of the tangent members for connecting the flag assembly thereto,
   c. a crank shaft journaled to another of the tangent members,
   d. the tangent members include a tangent wrist carrying the tangent post thereon, and a pair of tangent arms having the crank shaft connection thereto,
   e. the tangent arms are interconnected for relative longitudinal sliding movement therebetween,
   f. the tangent wrist is connected between the tangent arms and interconnected to one of the tangent arms for relative transverse sliding movement with respect thereto,
   g. a longitudinal adjustment means disposed between the pair of tangent arms to shiftably engage one and be held captive in the other to cause relative sliding movement in the longitudinal direction therebetween,
   h. a transverse adjustment means disposed between the tangent wrist and one of the tangent arms to shiftably engage one and be captively held in the other to cause relative sliding movement in the transverse direction therebetween,
   i. the tangent arms define an upper tangent arm and tangent base,
   j. the tangent base is interconnected to (1) the upper tangent arm for relative longitudinal sliding movement therebetween, and (2) the tangent wrist for relative transverse sliding movement therebetween with respect to the upper tangent arm,
   k. the tangent base has a transverse aperture through which a portion of the tangent wrist extends,
   l. the tangent base has a longitudinal aperture which is shallower than and crosses over the transverse aperture,
   m. the transverse aperture has a threaded portion,
   n. the longitudinal aperture has a threaded portion,
   o. a transverse aperture is formed in the tangent wrist corresponding to and in alignment with the threaded portion of the transverse aperture of the tangent base,
   p. the upper tangent arm has a longitudinal aperture formed therein corresponding to and in alignment with the longitudinal aperture of the tangent base, q. the adjustment means define a pair of screws, one disposed in the corresponding transverse apertures of the tangent wrist and tangent base and the other disposed in the corresponding longitudinal apertures of the upper tangent arm and the tangent base,
r. each of the screws is held captive in the unthreaded aperture and threadedly engaged in the threaded aperture, whereby turning of the screw will produce relative motion between the respective tangent members, and
s. releasable locking means normally connected to lock the tangent arm and the tangent base together, and adapted to release the same during movement of either of the adjustment means.

2. A tangent for gas meters comprising:
a. a plurality of interconnected tangent members,
b. aligned apertures formed in adjacent tangent members, with one of the apertures threaded and the other of the apertures unthreaded,
c. screw means disposed in the aligned apertures to engage the threads of said one of the apertures,
d. means formed on the member having the unthreaded aperture to hold the screw means captive and to permit rotation thereof whereby on rotation of the screw means the tangent members will be moved in the direction of the aligned apertures toward or away from each other,
e. the tangent members include a tangent wrist, a tangent arm and a tangent base,
f. the tangent wrist is sandwiched between the tangent arm and the tangent base, and
g. a releasable locking means to engage the tangent arm and tangent base normally to clamp the tangent wrist therebetween on the tangent arm and tangent base being locked together thereby, and the releasable locking means is adapted to be released during rotation of either of the screw means to permit adjustment of the tangent members.

3. The combination claimed in claim 2 wherein:
a. the releasable locking means includes a screw and nut,
b. the base member has a hole,
c. the tangent arm has a longitudinal slot in alignment with the hole in the base member, whereby the locking means in released condition is free to be shifted longitudinally upon relative longitudinal movement of the tangent arm and tangent base.

4. The combination claimed in claim 3 wherein:
a. the aligned apertures extend longitudinally within the tangent arm and tangent base,
b. the aligned apertures extend transversely within the adjacent tangent wrist and tangent base,
c. the tangent base having each of the apertures therein threaded and disposed in perpendicular relationship to each other, and
d. the transverse aperture being deeper than the longitudinal aperture to permit the tangent wrist portion to be disposed therein without interference with the longitudinal aperture and screw means therein.

* * * * *